(12) United States Patent
Giusto et al.

(10) Patent No.: US 10,565,148 B2
(45) Date of Patent: Feb. 18, 2020

(54) METHOD AND SYSTEM FOR CONFIGURING FILTER OBJECTS FOR A CONTROLLER AREA NETWORK CONTROLLER

(71) Applicant: GM GLOBAL TECHNOLOGY OPERATIONS LLC, Detroit, MI (US)

(72) Inventors: Paolo Giusto, Mountain House, CA (US); Grant A. Soremekun, Pacifica, CA (US); Michael A. Turley, Dexter, MI (US); Ramesh S, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/978,709

(22) Filed: May 14, 2018

(65) Prior Publication Data
US 2019/0347232 A1  Nov. 14, 2019

(51) Int. Cl.
*G06F 3/00* (2006.01)
*G06F 13/40* (2006.01)
*H04L 12/40* (2006.01)

(52) U.S. Cl.
CPC .... *G06F 13/4027* (2013.01); *H04L 12/40013* (2013.01)

(58) Field of Classification Search
CPC ................ G06F 13/4027; H04L 12/40013
USPC .................................................. 710/5
See application file for complete search history.

(56) References Cited

U.S. PATENT DOCUMENTS

2008/0263093 A1* 10/2008 Alcorn .............. G06F 9/542
2018/0227145 A1*  8/2018 Brochi ................ H04L 12/40

\* cited by examiner

*Primary Examiner* — Chun Kuan Lee
(74) *Attorney, Agent, or Firm* — Cantor Colburn LLP

(57) ABSTRACT

A system and method for configuring a filter object for a controller area network is disclosed. The method includes determining, by a processor, a plurality of message identifiers of messages that are to be captured by a filter object. The method also includes performing factorization of a function that represents the plurality of message identifiers to generate a simplified function. The method also includes configuring at least one filter object based on the generated simplified function.

20 Claims, 5 Drawing Sheets

METHOD AND SYSTEM FOR CONFIGURING FILTER OBJECTS FOR A CONTROLLER AREA NETWORK CONTROLLER

INTRODUCTION

The subject embodiments relate to configuring filter objects for a Controller Area Network (CAN) controller. Specifically, one or more embodiments can be directed to configuring a filter object that filters messages that are received on a network bus of the controller area network. One or more embodiments can filter the messages of the network bus to determine one or more messages that are relevant for one or more controllers, for example.

A CAN controller is a software and/or hardware interface for an automotive controller communicating via the Controller Area Network (CAN) protocol. The CAN protocol is a communication standard that enables communication between controllers on a network. The protocol can be used in a variety of applications, including but not limited to, applications relating to automotive, factory automation, industrial and commercial buildings, etc. As messages are transmitted over a serial bus and as each controller receives the messages, each controller uses one or more filter objects to determine which of the received messages are relevant to the controller. As described in more detail below, each received message has a corresponding message identifier, and the determination of whether a received message is relevant to a particular controller is performed by comparing the received message identifier against a list of identifiers for messages that the particular controller needs to process. When a filter object in the CAN controller determines that a message is relevant to the controller, the relevant message is made available to the controller for further processing.

SUMMARY

According to an exemplary embodiment, a method can include determining, by a processor, a plurality of message identifiers of messages that are to be captured by a filter object. The method can also include performing factorization of a function that represents the plurality of message identifiers to generate a simplified function, whereby the function is a sum of Boolean products. The method can also include configuring at least one filter object based on the generated simplified function.

In another exemplary embodiment, the method can also include adding at least one message identifier to the plurality of message identifiers. The added at least one message identifier does not correspond to any message that is transmitted on a network bus, and the adding of the at least one message identifier results in a simplified function that is simpler compared to a simplified function that is generated without the added at least one message identifier.

In another exemplary embodiment, the messages that are to be captured by the filter object correspond to messages that are to be received and processed by a controller of a controller area network via a network bus.

In another exemplary embodiment, the added at least one message identifier does not correspond to any message that is transmitted on the network bus of the controller area network.

In another exemplary embodiment, performing factorization of the function includes performing a Boolean factorization of the function.

In another exemplary embodiment, performing the Boolean factorization includes simplifying the function to have a minimal set of Boolean products.

In another exemplary embodiment, each message identifier that is added to the plurality of message identifiers differs from another message identifier of the plurality of message identifiers by a single bit.

In another exemplary embodiment, configuring the at least one filter object includes configuring a set of identifier bits and a set of mask bits.

In another exemplary embodiment, the controller corresponds to a controller of a plurality of controllers of the controller area network.

In another exemplary embodiment, adding the at least one message identifier includes adding different combinations of message identifiers to determine which combination results in a simplest simplified function.

In another exemplary embodiment, a system includes an electronic processor configured to determine a plurality of message identifiers of messages that are to be captured by a filter object. The electronic processor is also configured to perform factorization of a function that represents the plurality of message identifiers to generate a simplified function. The electronic processor is also configured to configure at least one filter object based on the generated simplified function.

In another exemplary embodiment, the electronic processor is further configured to add at least one message identifier to the plurality of message identifiers. The added at least one message identifier does not correspond to any message that is transmitted on a network bus, and the adding of the at least one message identifier results in a simplified function that is simpler compared to a simplified function that is generated without the added at least one message identifier.

In another exemplary embodiment, the messages that are to be captured by the filter object correspond to messages that are to be received and processed by a controller of a controller area network via a network bus.

In another exemplary embodiment, the added at least one message identifier does not correspond to a message that is transmitted on the network bus of the controller area network.

In another exemplary embodiment, performing factorization of the function includes performing a Boolean factorization of the function.

In another exemplary embodiment, performing the Boolean factorization includes simplifying the function to have a minimal set of Boolean products.

In another exemplary embodiment, each message identifier that is added to the plurality of message identifiers differs from another message identifier of the plurality of message identifiers by a single bit.

In another exemplary embodiment, configuring the at least one filter object includes configuring a set of identifier bits and a set of mask bits.

In another exemplary embodiment, the controller corresponds to a controller of a plurality of controllers of the controller area network.

In another exemplary embodiment, adding the at least one message identifier includes adding different combinations of message identifiers to determine which combination results in a simplest simplified function.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
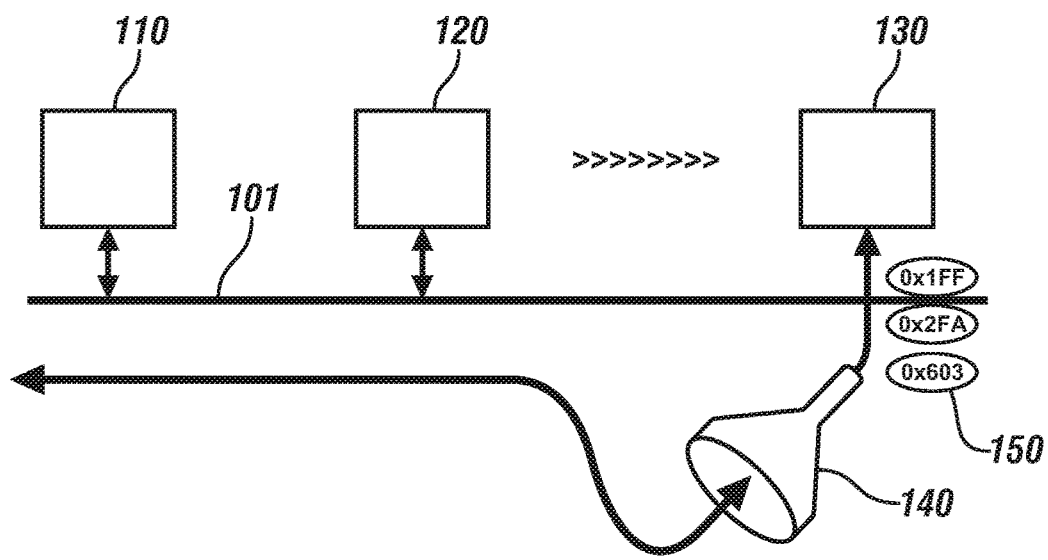
FIG. 1 illustrates filtering of messages that are transmitted on a bus.

FIG. 1 illustrates filtering of messages that are transmitted on a bus. As previously described, CAN messages are transmitted via a network bus within a controller area network to facilitate communication between microcontrollers, electronic control units, and/or devices, for example. In the example of FIG. 1, CAN messages are transmitted on a CAN bus 101 between controller 110, controller 120, and controller 130. Each controller can use at least one filter object to determine which messages are relevant to the controller's functioning. The messages that are captured by the at least one filter can be considered to be the messages that are relevant to the controller that corresponds to the at least one filter. The messages that are captured by the at least one filter are thus processed by the corresponding controller. The messages can be filtered based on message identifiers that are associated with the messages. In the example of FIG. 1, filter object 140 performs filtering of the messages transmitted on the CAN bus on behalf of controller 130. Controller 130 uses filter object 140 to determine/capture a set of message identifiers 150 of messages that are relevant to controller 130. In the example of FIG. 1, the set of relevant message identifiers 150 of messages that are relevant to controller 130 include message identifiers 0x1FF, 0x2FA, and 0x603, where these message identifiers are represented in a 3-digit hexadecimal format.

With the conventional approaches of configuring filter objects, a separate filter object is configured for each relevant message identifier. In other words, with the conventional approaches, a one-to-one correspondence generally exists between each relevant message identifier and each configured filter object. Each configured filter object can be hardware-implemented within its corresponding CAN controller. However, because the hardware resources that can be allocated for each filter object are limited, the capacity/capability of the hardware-implemented filter objects can be exceeded as the number of relevant messages increases over the life time of the controller. When the capacity/capability of the hardware-implemented filter objects is exceeded, the conventional approaches generally supplement one or more hardware filter objects with a software-implemented filter in order to ensure that the necessary filtering function continues to be properly performed. However, the conventional approach of using a supplemental software-implemented filter is generally undesirable because this supplemental filter generally requires additional processor computing power in order to perform the necessary filtering functions, and the capacity/capability of this processor can eventually be exceeded as more and more messages are added to the set of messages that are relevant to each controller.

As described in more detail below, one or more embodiments can increase the number of identifiers that are captured by a filter object and thus reduce the number of necessary filter objects. Specifically, one or more embodiments can reduce the number of filter objects and can thus reduce the amount of hardware memory resources that are needed to configure the filter objects. By reducing the amount of resources that are needed to configure the filter objects, one or more embodiments can enable the configured filter objects to be hardware-implemented, without requiring any supplemental software implementation. As such, one or more embodiments can allow controllers to conserve computing power and to conserve computing resources. One or more embodiments can increase the number of identifiers that are captured by a filter object (and thus reduce the number of necessary filter objects) by selectively adding at least one message identifier to the set of relevant message identifiers, where the selective addition of the at least one message identifier allows one or more embodiments to reduce the number of filter objects that are necessary to implement filtering of the relevant message identifiers. Specifically, as described in more detail herein, one or more embodiments can reduce the number of necessary configured filter objects by simplifying a function that represents the relevant message identifiers. In one example embodiment, simplifying the function corresponds to minimizing a 2-level Boolean logic expression that represents the relevant message identifiers. Minimization of a Boolean logic expression generally refers to factoring a Boolean expression in order to reduce/minimize the cost of implementing the Boolean expression.

Figure 2:
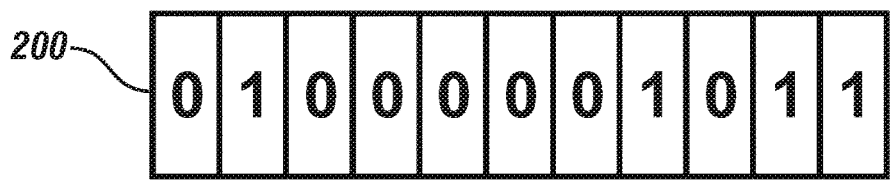
FIG. 2 illustrates a format of a message identifier of a controller-area-network message in accordance with one or more embodiments.

FIG. 2 illustrates a format of a message identifier of a controller-area-network message in accordance with one or more embodiments. In the example of FIG. 2, each message identifier can be expressed as a plurality of binary bits. Specifically, the example message identifier of FIG. 2 includes 11 binary bits (i.e., "01000001011"). Other embodiments can be applied to identifiers with any number of bits. As previously described, a controller can use a configured filter object to determine whether a message is to be accepted or rejected (i.e., to determine whether the message is relevant or irrelevant to the controller). Filter objects are configured to analyze the binary bits of each message identifier of each message that is transmitted on the network bus, and the filter objects can thus determine which (if any) of the messages are relevant.

Figure 3:
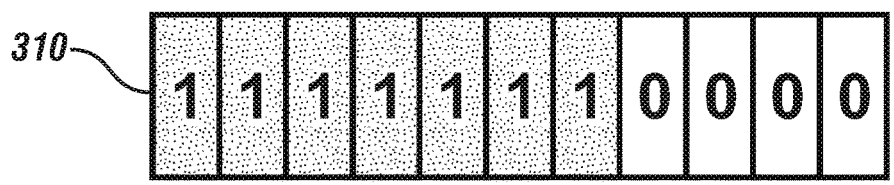
FIG. 3 illustrates components of a filter object in accordance with one or more embodiments.
Figure 3:
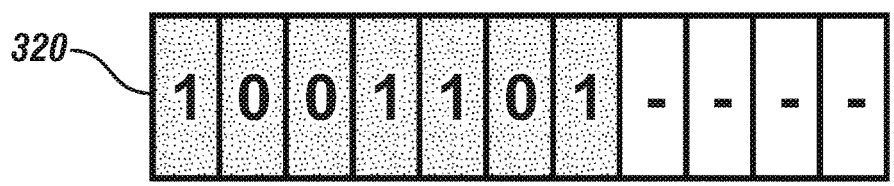

FIG. 3 illustrates components of a filter object in accordance with one or more embodiments. As previously described, control-area-network messages can be filtered by using one or more configured filter objects. Each filter object can include a set of identifier bits 310 and a set of masking bits 320. With one or more embodiments, the set of identifier bits 310 identifies which bits of a message identifier needs to be examined by the filter object. For example, in the example of FIG. 3, set of identifier bits 310 indicates that the leftmost seven bits need to be examined by the CAN controller in order to determine whether a message is a relevant message. The leftmost seven bits of set of identifier bits 310 have a value of "1," while the rightmost four bits have a value of "0." While the set of identifier bits 310 indicate which bits need to be examined by the Can controller, the set of masking bits 320 indicate the specific bits that the examined bits need to match in order for the examined message identifier to be considered by the filter as an identifier of a relevant message. For example, the set of masking bits 320 indicates that the leftmost seven bits of a message identifier need to match "1001101" in order for the examined message identifier to be considered by the filter as an identifier of a relevant message. Because identifier bits 310 indicates that the four rightmost bits do not need to be examined, the four rightmost bits of the masking bits are not configured. In other words, the four rightmost bits of a message identifier need not be considered by the CAN controller when filtering the message identifier using the filter object of FIG. 3.

Figure 4:
FIG. 4 illustrates an example plurality of controller-area-network message identifiers that are captured by multiple filters in accordance with one or more embodiments.

FIG. 4 illustrates an example plurality of controller-area-network message identifiers 410 that are captured by multiple filters in accordance with one or more embodiments. FIG. 4 illustrates five example message identifiers of relevant messages. The message identifiers (expressed using a hexadecimal representation) are: 0x010, 0x011, 0x014, 0x016, and 0x017. As previously described, the conventional approaches would typically configure a separate filter object for each relevant message identifier. As such, in order to filter the five example message identifiers of FIG. 4, the conventional approaches would typically configure five separate filter objects. Also, because each filter object would also need to be implemented by using a set of identifier bits and a set of masking bits, the conventional approaches for configuring filter objects would be very resource intensive.

In contrast to the conventional approaches, one or more embodiments can generate at least one filter object which captures more relevant message identifiers by selectively adding at least one message identifier to the set of relevant message identifiers, where the relevant message identifiers correspond to messages that are to be captured by the filter objects. The selective addition of at least one message identifier allows one or more embodiments to generate a filter object which captures more relevant message identifiers, and thus one or more embodiments can reduce the number of filter objects that are necessary to implement filtering of the relevant message identifiers. After the at least one message identifier is added to the set of relevant message identifiers, one or more embodiments can perform factorization of a function that represents the total set of message identifiers. In one or more embodiments, performing factorization of the function can include simplifying/minimizing a Boolean logic expression that represents a new set of message identifiers. Finally, by configuring the filter objects in accordance with the simplified function, one or more embodiments can reduce the number of filter objects that are necessary to implement the desired filtering, as described in more detail below.

Figure 5:
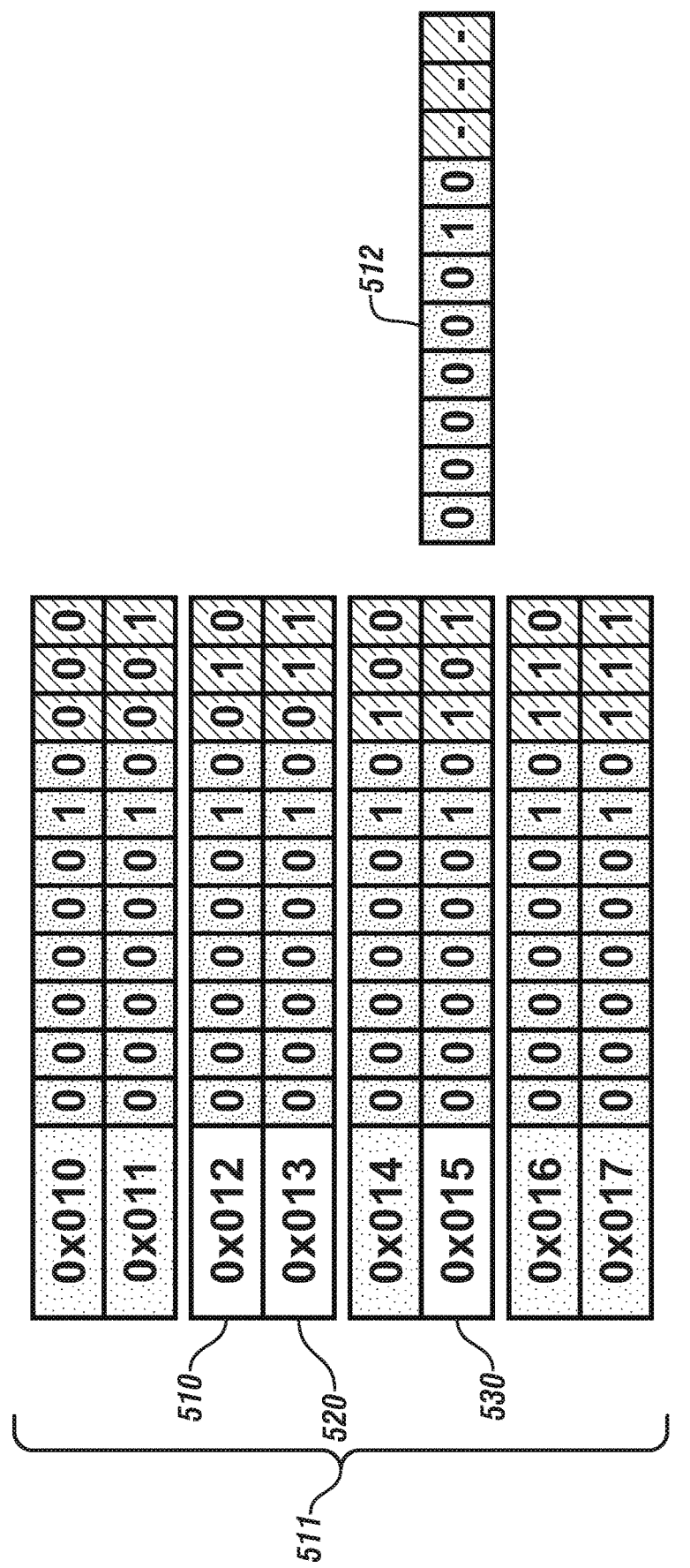
FIG. 5 illustrates adding message identifiers to the plurality of message identifiers that are to be captured by a single filter in accordance with one or more embodiments.

FIG. 5 illustrates adding message identifiers (510, 520, and 530) (which correspond to messages that are not to be transmitted on the bus) to the plurality of message identifiers that are to be captured by the filter in accordance with one or more embodiments. Each message identifier of a relevant message (that is to be captured by the filter) can be represented as a numerical value. FIG. 5 illustrates a set of relevant message identifiers that includes identifiers 0x010, 0x011, 0x014, 0x016, and 0x017, which are the same set of relevant message identifiers as shown in FIG. 4. One or more embodiments can selectively add at least one message identifier to the set of relevant message identifiers in order to reduce the filter objects that are needed to filter the set of relevant message identifiers. For example, in the example of FIG. 5, message identifier 510, message identifier 520, and message identifier 530 are added to the set of relevant message identifiers.

By selectively adding these message identifiers, one or more embodiments can increase the number of message identifiers that a filter object can capture. Thus, by increasing the number of message identifiers that one or more filter objects is able to capture, one or more embodiments can reduce the number of necessary filter objects that are necessary to perform the filtering. For example, referring again to FIG. 5, by selectively adding message identifier 530, corresponding to identifier 0x015 (i.e., 00000010101), to the set of relevant message identifiers, the need for separate filter objects to capture messages 0x014, 0x016, and 0x017 is removed, and only one filter object is needed to capture messages 0x014, 0x016, and 0x017. In other words, in this example, the one filter can now disregard the first two bits from the right (i.e., the two least significant bits). By further adding additional message identifiers to the set of relevant message identifiers, one or more embodiments can further reduce the number of filter objects that are necessary to perform the filtering. After adding message identifier 510, message identifier 520, and message identifier 530, a single filter object mask 512 can be used to filter for all eight message identifiers of the relevant set of identifiers 511. Single filter object mask 512 (i.e., 00000010 - - - ) takes the leftmost eight bits of a message identifier into consideration when examining the message identifier to determine whether the corresponding message is relevant, while ignoring the rightmost three bits of the message identifier.

With one or more embodiments, each of the selectively added message identifiers can correspond to messages that will not be transmitted at any time on the network bus. If the added message identifiers correspond to messages that will not appear on the network bus, then the addition of such message identifiers to the set of relevant message identifiers will not cause the configured filter object to consider an irrelevant message identifier as being a relevant message identifier. With one or more embodiments, each message identifier that is selectively added can be a message identifier that differs from another message identifier (of the set of identifiers) by a single bit. By adding a message identifier that differs from another message identifier by a single bit, one or more embodiments can eliminate the need for a filter to distinguish between these two message identifiers, as previously described.

Figure 6:
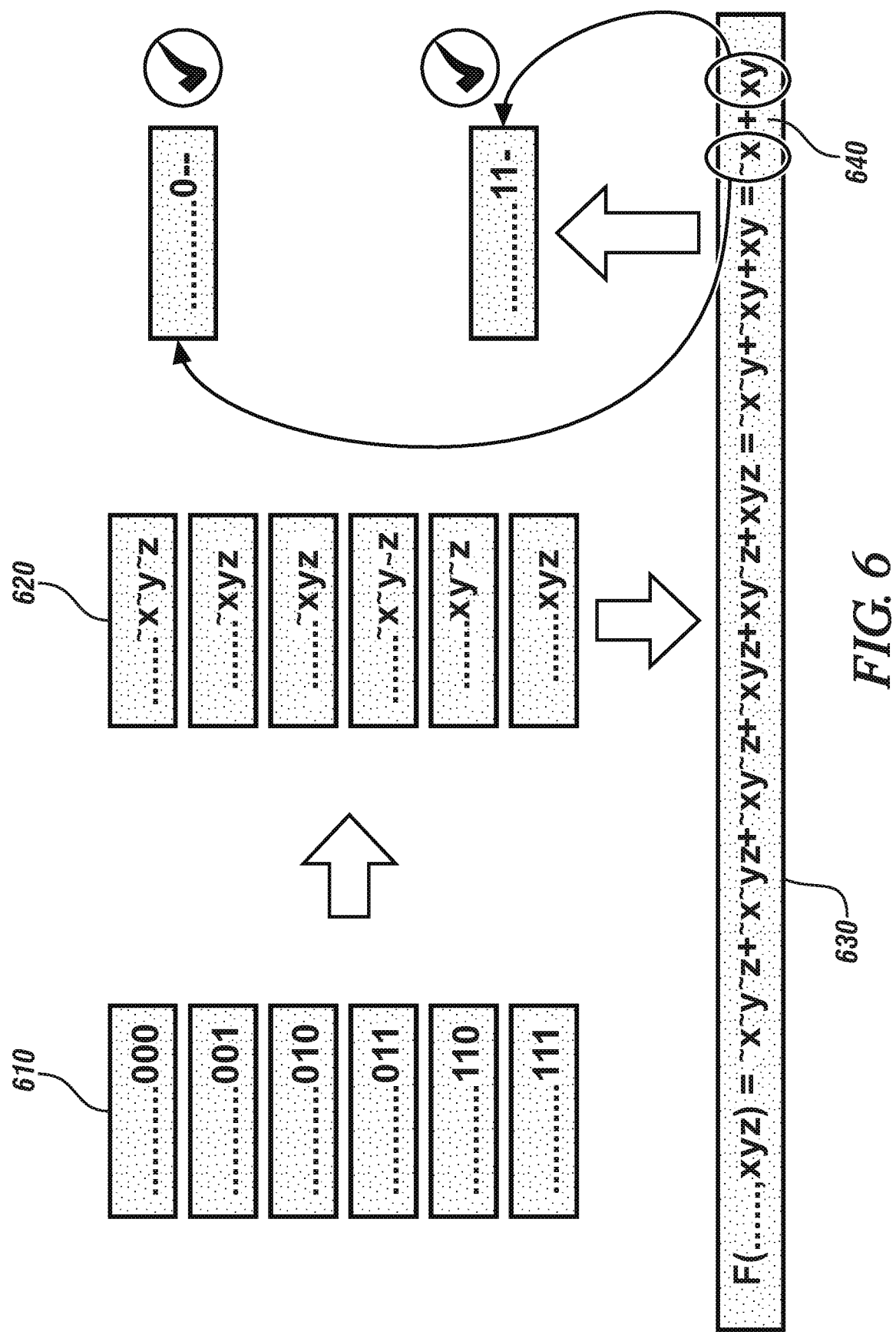
FIG. 6 illustrates configuring example filter objects in accordance with one or more embodiments.

FIG. 6 illustrates configuring example filter objects in accordance with one or more embodiments. One or more embodiments can first determine a set of relevant message identifiers 610. As previously described, the set of relevant message identifiers 610 can include selectively added message identifiers that can reduce the number of filter objects that are needed.

The message identifiers 610 that are to be considered as being relevant can be represented by corresponding Boolean products 620. The Boolean products 620 that represent the relevant message identifiers 610 can, in turn, be expressed as a Boolean function 630. One or more embodiments can thus represent the message identifiers as a function. One or more embodiments can then simplify the function. For example, one or more embodiments can perform a Boolean simplification of the Boolean function 630. One or more embodiments can thus determine a simplified expression 640 (i.e., "~x+xy"). One or more embodiments can then configure filter objects based on the simplified Boolean expression 640. In the example of FIG. 6, the simplified expression 640 corresponds to "~x+xy." As such, the relevant message identifiers of FIG. 6 can be filtered by configuring two filter objects (with one filter object corresponding to "~x" and the other filter object corresponding to "xy"). Thus, instead of configuring a separate filter object for each message identifier of message identifiers 610, one or more embodiments can reduce and simplify the filter objects that need to be configured by configuring the filter objects based on the simplified Boolean expression 640.

Figure 7:
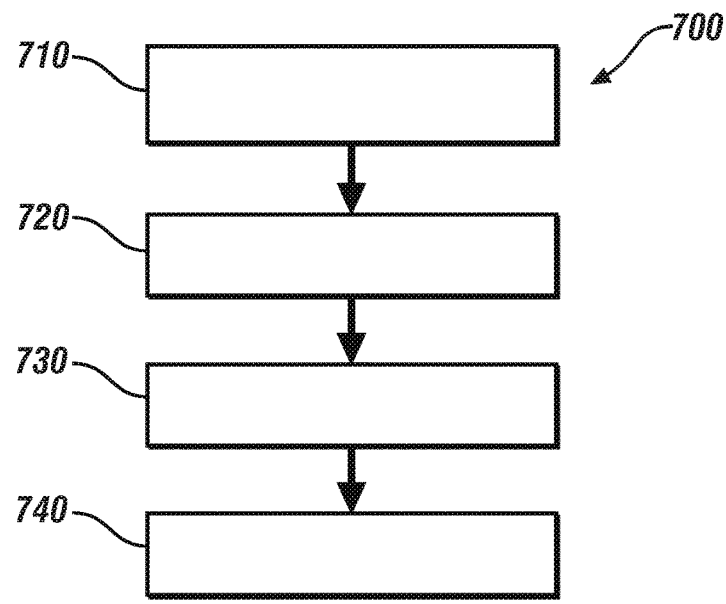
FIG. 7 depicts a flowchart of a method in accordance with one or more embodiments.

FIG. 7 depicts a flowchart of a method 700 in accordance with one or more embodiments. The method of FIG. 7 can be performed in order to configure a filter object for a controller area network. The method of FIG. 7 can be performed by an automated algorithm that is performed on a computer, in order to configure the filter objects that are used by CAN controllers. For example, the method of FIG. 7 can be performed by an automated algorithm running on a computer that configures filter objects that are used by a controller area network of a vehicle. In one embodiment, portions of the method can be performed by a system that is separate from the vehicle. In another embodiment, portions of the method can be performed by a vehicle system. The method can include, at block 710, determining, by a processor, a plurality of message identifiers of messages that are to be captured by a filter object. The method can also include, at block 720, performing factorization of a function that represents the plurality of message identifiers to generate a simplified function. The method can also include, at block 730, configuring at least one filter object based on the generated simplified function.

Figure 8:
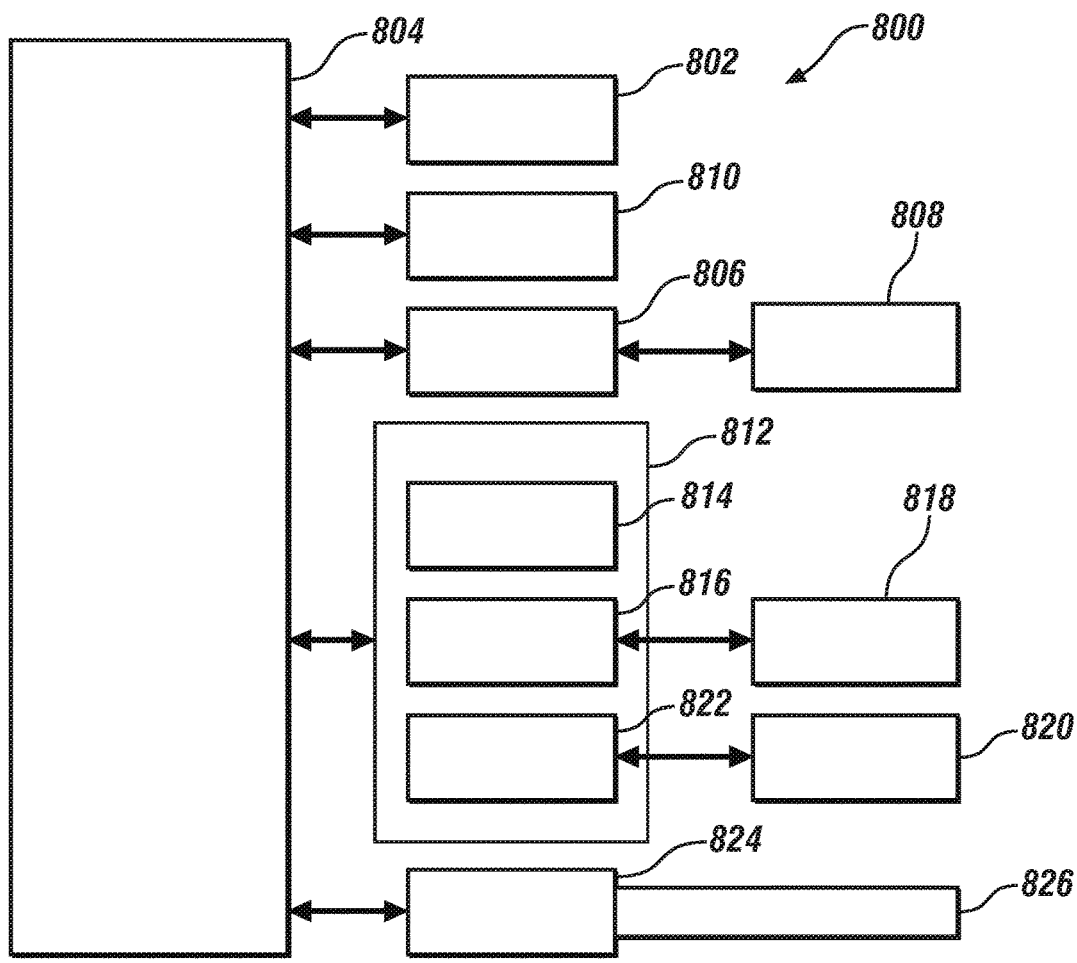
FIG. 8 depicts a high-level block diagram of a computing system, which can be used to implement one or more embodiments.

FIG. 8 depicts a high-level block diagram of a computing system 800, which can be used to implement one or more embodiments. Computing system 800 can correspond to, at least, a system that configures a filter object for a controller area network. With one or more embodiments, the controller area network can be deployed and configured within a vehicle electrical architecture, implementing, but not limited to, the physical and logical layers of the CAN protocol. Computing system 800 can be used to implement hardware components of systems capable of performing methods described herein. Although one exemplary computing system 800 is shown, computing system 800 includes a communication path 826, which connects computing system 800 to additional systems (not depicted). Computing system 800 and additional systems are in communication via communication path 826, e.g., to communicate data between them.

Computing system 800 includes one or more processors, such as processor 802. Processor 802 is connected to a communication infrastructure 804 (e.g., a communications bus, cross-over bar, or network). Computing system 800 can include a display interface 806 that forwards graphics, textual content, and other data from communication infrastructure 804 (or from a frame buffer not shown) for display on a display unit 808. Computing system 800 also includes a main memory 810, preferably random access memory (RAM), and can also include a secondary memory 812.

There also can be one or more disk drives 814 contained within secondary memory 812. Removable storage drive 816 reads from and/or writes to a removable storage unit 818. As will be appreciated, removable storage unit 818 includes a computer-readable medium having stored therein computer software and/or data.

In alternative embodiments, secondary memory 812 can include other similar means for allowing computer programs or other instructions to be loaded into the computing system. Such means can include, for example, a removable storage unit 820 and an interface 822.

In the present description, the terms "computer program medium," "computer usable medium," and "computer-readable medium" are used to refer to media such as main memory 810 and secondary memory 812, removable storage drive 816, and a disk installed in disk drive 814. Computer programs (also called computer control logic) are stored in main memory 810 and/or secondary memory 812. Computer programs also can be received via communications interface 824. Such computer programs, when run, enable the computing system to perform the features discussed herein. In particular, the computer programs, when run, enable processor 802 to perform the features of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the embodiments not be limited to the particular embodiments disclosed, but will include all embodiments falling within the scope of the application.

What is claimed is:

1. A method, the method comprising:
    determining, by a processor, a plurality of message identifiers of messages that are to be captured by a plurality of filter objects;
    selectively adding at least one message identifier to the plurality of message identifiers, the at least one message identifier differs from another message identifier of the plurality of message identifiers by a single bit and reduces a number of the plurality of filter objects;
    performing factorization of a function that represents the plurality of message identifiers to generate a simplified function; and
    configuring at least one filter object of the plurality of filter objects based on the generated simplified function to provide a configured filter object that captures all messages comprising one of the plurality of message identifiers.

2. The method of claim 1, wherein the added at least one message identifier does not correspond to any message that is transmitted on a network bus, and the adding of the at least one message identifier results in a simplified function that is simpler than a simplified function that is generated without the added at least one message identifier.

3. The method of claim 1, wherein the messages that are to be captured by the filter object correspond to messages that are to be received and processed by a controller of a controller area network via a network bus.

4. The method of claim 3, wherein the added at least one message identifier does not correspond to any message that is transmitted on the network bus of the controller area network.

5. The method of claim 1, wherein performing factorization of the function comprises performing a Boolean factorization of the function.

6. The method of claim 5, wherein performing the Boolean factorization comprises simplifying the function to have a minimal set of Boolean products.

7. The method of claim 2, wherein each message identifier that is added to the plurality of message identifiers differs from another message identifier of the plurality of message identifiers by a single bit.

8. The method of claim 1, wherein configuring the at least one filter object comprises configuring a set of identifier bits and a set of mask bits.

9. The method of claim 3, wherein the controller corresponds to a controller of a plurality of controllers of the controller area network.

10. The method of claim 2, wherein adding the at least one message identifier comprises adding different combinations of message identifiers to determine which combination results in a simplest simplified function.

11. A system, comprising:
an electronic processor configured to:
determine a plurality of message identifiers of messages that are to be captured by a plurality of filter objects;
selectively adding at least one message identifier to the plurality of message identifiers, the at least one message identifier differs from another message identifier of the plurality of message identifiers by a single bit and reduces a number of the plurality of filter objects;
perform factorization of a function that represents the plurality of message identifiers to generate a simplified function; and
configure at least one filter object of the plurality of filter objects based on the generated simplified function to provide a configured filter object that captures all messages comprising one of the plurality of message identifiers.

12. The system of claim 11, wherein the added at least one message identifier does not correspond to any message that is transmitted on a network bus, and the adding of the at least one message identifier results in a simplified function that is simpler than a simplified function that is generated without the added at least one message identifier.

13. The system of claim 11, wherein the messages that are to be captured by the filter object correspond to messages that are to be received and processed by a controller of a controller area network via a network bus.

14. The system of claim 13, wherein the added at least one message identifier does not correspond to any message that is transmitted on the network bus of the controller area network.

15. The system of claim 11, wherein performing factorization of the function comprises performing a Boolean factorization of the function.

16. The system of claim 15, wherein performing the Boolean factorization comprises simplifying the function to have a minimal set of Boolean products.

17. The system of claim 12, wherein each message identifier that is added to the plurality of message identifiers differs from another message identifier of the plurality of message identifiers by a single bit.

18. The system of claim 11, wherein configuring the at least one filter object comprises configuring a set of identifier bits and a set of mask bits.

19. The system of claim 13, wherein the controller corresponds to a controller of a plurality of controllers of the controller area network.

20. The system of claim 12, wherein adding the at least one message identifier comprises adding different combinations of message identifiers to determine which combination results in a simplest simplified function.

* * * * *